US009946143B1

(12) United States Patent
Akiyama

(10) Patent No.: US 9,946,143 B1
(45) Date of Patent: Apr. 17, 2018

(54) LIGHT SOURCE APPARATUS AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/805,888

(22) Filed: Nov. 7, 2017

(30) Foreign Application Priority Data

Nov. 28, 2016 (JP) .................... 2016-229801

(51) Int. Cl.
*G03B 21/20* (2006.01)
*G03B 21/00* (2006.01)
*G02B 26/00* (2006.01)
*G03B 21/28* (2006.01)

(52) U.S. Cl.
CPC ......... *G03B 21/204* (2013.01); *G02B 26/008* (2013.01); *G03B 21/008* (2013.01); *G03B 21/208* (2013.01); *G03B 21/2013* (2013.01); *G03B 21/2073* (2013.01); *G03B 21/28* (2013.01)

(58) Field of Classification Search
CPC ................................................. G03B 21/204
See application file for complete search history.

(56) References Cited

U.S. PATENT DOCUMENTS

2012/0026472 A1* 2/2012 Masuda ............... G03B 21/204
353/85

FOREIGN PATENT DOCUMENTS

| JP | 2014-186081 A | 10/2014 |
| JP | 2015-222299 A | 12/2015 |
| JP | 2015-225152 A | 12/2015 |
| JP | 2015-232677 A | 12/2015 |

* cited by examiner

*Primary Examiner* — Sultan Chowdhury
*Assistant Examiner* — Danell L Owens
(74) *Attorney, Agent, or Firm* — Oliff PLC

(57) ABSTRACT

A light source apparatus according to an aspect of the invention includes a first light source section that includes a first solid-state light source that emits excitation light, a second light source section that includes a second solid-state light source that emits red light and a third solid-state light source that emits blue light and outputs color light containing the red light and the blue light, and a rotor irradiated with the excitation light and the color light. The rotor is provided with a phosphor section that emits fluorescence when irradiated with the excitation light and a diffuser section that diffuses the color light and outputs the diffused color light with the phosphor section and the diffuser section provided along the direction of rotation of the rotor.

17 Claims, 3 Drawing Sheets

LIGHT SOURCE APPARATUS AND PROJECTOR

BACKGROUND

1. Technical Field

An aspect of the present invention relates to a light source apparatus and a projector.

2. Related Art

As a light source apparatus used in a projector, there is a proposed light source apparatus in which a phosphor is irradiated with excitation light emitted from a solid-state light source, such as a semiconductor laser, and which uses fluorescence emitted from the phosphor.

JP-A-2014-186081, for example, discloses a light source apparatus including a light source, a phosphor wheel that is excited with light from the light source and emits fluorescence, and a wavelength selective wheel that removes part of the wavelength band of the fluorescence and transmits the light from the light source. JP-A-2014-186081 further describes an example of a phosphor wheel having a blue light transmitting region that transmits blue light emitted from a semiconductor laser, a yellow phosphor region that emits yellow light when excited with the blue light, and a green phosphor region that emits green light when excited with the blue light.

Fluorescence that is produced by a phosphor material of related art and belongs to a yellow range does not contain a sufficient amount of red light component. A projector including a light source apparatus employing a phosphor of this type therefore undesirably projects an image having a narrow color range, resulting in insufficient color reproduction.

SUMMARY

An advantage of some aspects of the invention is to provide a phosphor-based light source apparatus capable of increasing the proportion of a red light component in the light outputted from the light source apparatus. Another advantage of some aspects of the invention is to provide a projector that includes the light source apparatus and excels in color reproduction.

A light source apparatus according to an aspect of the invention includes a first light source section that includes a first solid-state light source that emits excitation light, a second light source section that includes a second solid-state light source that emits red light and a third solid-state light source that emits blue light and outputs color light containing the red light and the blue light, and a rotor irradiated with the excitation light and the color light. The rotor is provided with a phosphor section that emits fluorescence when irradiated with the excitation light and a diffuser section that diffuses the color light and outputs the diffused color light with the phosphor section and the diffuser section provided along a direction of rotation of the rotor.

The light source apparatus according to the aspect of the invention includes the second light source section, which includes the second solid-state light source, which emits red light, and the third solid-state light source, which emits blue light, and outputs the color light containing the red light and the blue light. Therefore, even if a red light component contained in the fluorescence is insufficient, the insufficient red light component can be compensated by the red light emitted from the second solid-state light source of the second light source section, whereby the proportion of the red light component in the light outputted from the light source apparatus can be increased. The excitation light formed of light that belongs to a blue region is absorbed by the phosphor section, but the output light contains blue light emitted from the third solid-state light source of the second light source section. The effect described above can widen the color region of the light outputted from the light source apparatus. Further, since the color light containing the red light and the blue light is diffused by the diffuser section, speckles resulting from the red light and the blue light can be removed.

In the light source apparatus according to the aspect of the invention, the first light source section may cause the excitation light to be incident on the phosphor section from a side facing a first surface of the rotor, and the second light source section may cause the color light to be incident on the diffuser section from a side facing a second surface of the rotor.

According to the configuration described above, the first light source section and the second light source section can be disposed on the opposite sides of the rotor, so that the first light source section and the second light source section will not interface with each other. The size of the light source apparatus can therefore be reduced.

In the light source apparatus according to the aspect of the invention, the phosphor section may include a phosphor layer provided on the side facing the first surface of the rotor and a reflection layer provided between the phosphor layer and the rotor, and the diffuser section may include a diffusive transmission section that diffusively transmits the color light through the rotor from the second surface to the first surface thereof.

According to the configuration described above, the fluorescence produced in the phosphor layer is reflected off the reflection layer and outputted via the first surface of the rotor. The color light from the second light source section diffusively passes through the diffusive transmission section and exits via the first surface of the rotor. Therefore, even in the case where the first and second light source sections are disposed on the opposite sides of the rotor, the fluorescence and the color light, which form output light from the light source apparatus, are allowed to exit in the same direction.

In the light source apparatus according to the aspect of the invention, the phosphor section may further include an antireflection layer provided on a surface of the phosphor layer, the surface on a side opposite the reflection layer.

According to the configuration described above, reflection of the excitation light at the surface of the phosphor layer is suppressed, whereby loss of the excitation light can be reduced.

The light source apparatus according to the aspect of the invention may further include a polarization separation element that is provided not only in an optical path of the excitation light traveling from the first light source section toward the rotor but in an optical path of the fluorescence and the color light outputted from the rotor and has a function of separating polarized light fluxes that belong to a blue region from each other. In this case, it is desirable that the excitation light incident on the polarization separation element is one of S-polarized light and P-polarized light, and that the blue light incident on the polarization separation element is another of S-polarized light and P-polarized light.

According to the configuration described above, the blue light having diffusively passed through the diffusive transmission section and exited out of the rotor passes, for example, as P-polarized light through the polarization separation element, and the excitation light is reflected, for example, as S-polarized light off the polarization separation element and directed toward the phosphor section. The first light source section can therefore be disposed on the side facing the first surface of the rotor with no interference with the blue light that exits via the first surface of the rotor.

In the light source apparatus according to the aspect of the invention, the diffusive transmission section may include a diffusive transmission section for red light that diffusively transmits the red light and a diffusive transmission section for blue light that diffusively transmits the blue light, and the diffusive transmission section for red light and the diffusive transmission section for blue light may be provided along the direction of rotation of the rotor.

According to the configuration described above, the diffusing functions of the diffusive transmission section for red light and the diffusive transmission section for blue light can be controlled independently of each other, whereby the degrees of diffusion of the red light and the blue light can be separately adjusted.

In the light source apparatus according to the aspect of the invention, a diffusing function of the diffusive transmission section for red light may be higher in terms of performance than the diffusing function of the diffusive transmission section for blue light.

According to the configuration described above, the speckle removable effect particularly for the red light, which is more likely to cause speckles to be visually recognized, can be enhanced.

In the light source apparatus according to the aspect of the invention, the phosphor section may include at least one of a green phosphor section that emits green light and a yellow phosphor section that emits yellow light.

According to the configuration described above, the brightness of an image can be adjusted.

In the light source apparatus according to the aspect of the invention, the phosphor section may include the green phosphor section and the yellow phosphor section, and the green phosphor section and the yellow phosphor section may be provided along the direction of rotation of the rotor.

According to the configuration described above, since the phosphor section includes the yellow phosphor section, the brightness of an image can be improved. Further, since the yellow light emitted from the yellow phosphor section contains a red light component, the amount of red light emitted from the second solid-state light source can be reduced.

In the light source apparatus according to the aspect of the invention, a wavelength of the excitation light may be shorter than or equal to a wavelength of the blue light.

According to the configuration described above, the function of the excitation light can be readily provided.

In the light source apparatus according to the aspect of the invention, the wavelength of the excitation light may be 445 nm±15 nm.

According to the configuration described above, the light emission efficiency in the phosphor section can be sufficiently increased.

In the light source apparatus according to the aspect of the invention, a wavelength of the blue light may be 465 nm±15 nm.

According to the configuration described above, the color region of an image can be widened.

The light source apparatus according to the aspect of the invention may further include a light emission control section that controls on/off actions of the first solid-state light source, the second solid-state light source, and the third solid-state light source. In this case, the light emission control section may turn on the first solid-state light source when an angle of rotation of the rotor falls within an angular range where the excitation light is allowed to be incident on the phosphor section.

According to the configuration described above, the first solid-state light source can be turned off during the period for which the excitation light is not incident on the phosphor section, whereby the electric power consumed by the first solid-state light source can be reduced.

The light source apparatus according to the aspect of the invention may further include a light emission control section that controls on/off actions of the first solid-state light source, the second solid-state light source, and the third solid-state light source. In this case, the light emission control section may turn on the second solid-state light source and the third solid-state light source when an angle of rotation of the rotor falls within an angular range where the color light is allowed to be incident on the diffuser section.

According to the configuration described above, the second solid-state light source and the third solid-state light source can be turned off during the period for which the red light and the blue light are not incident on the diffuser section, whereby the electric power consumed by the second solid-state light source and the third solid-state light source can be reduced.

In the light source apparatus according to the aspect of the invention, the first solid-state light source, the second solid-state light source, and the third solid-state light source may each be formed of a semiconductor laser.

According to the configuration described above, a compact, high-output light source apparatus can be achieved.

A projector according to another aspect of the invention includes the light source apparatus according to the aspect of the invention, a light modulator that modulates light from the light source apparatus in accordance with image information to produce image light, and a projection system that projects the image light from the light modulator.

Since the projector according to the aspect of the invention includes the light source apparatus according to the aspect of the invention, a projector that projects an image having a wide color range and excels in color reproduction can be provided.

In the projector according to the aspect of the invention, the light modulator may be formed of a digital micromirror device.

According to the configuration described above, a projector having a simple configuration can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 and 2.

Figure 1:
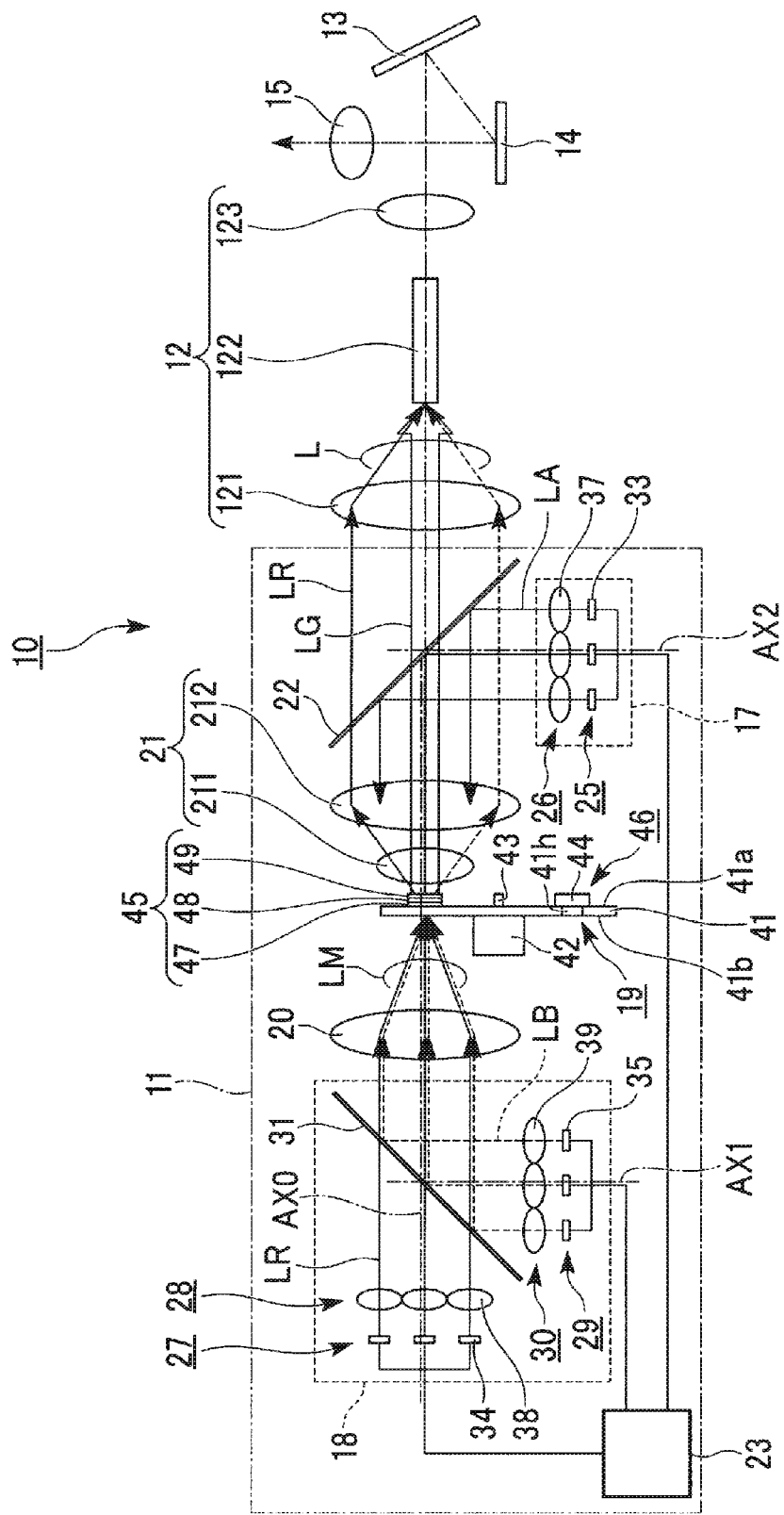
FIG. 1 is a schematic configuration diagram showing a projector according to a first embodiment.

FIG. 1 is a schematic configuration diagram showing a projector according to the first embodiment.

Figure 2:
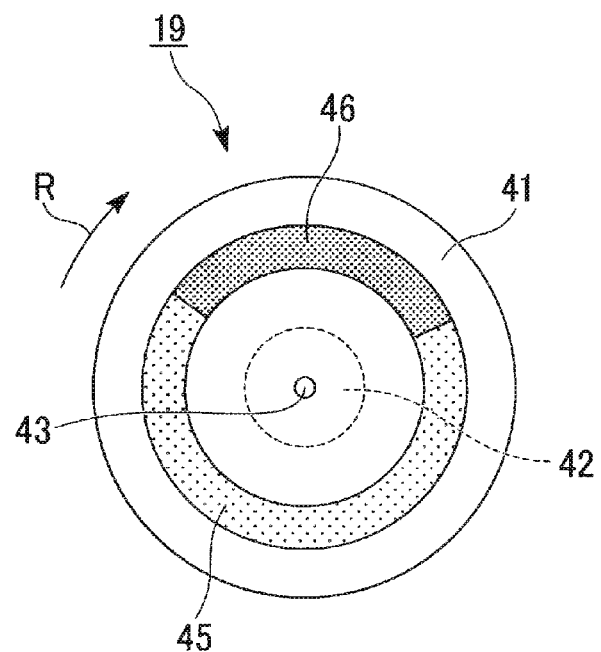
FIG. 2 is a front view of a rotation unit.

FIG. 2 is a front view of a rotation unit used in a light source apparatus and viewed from the side facing a first surface of a rotating plate.

In the following drawings, components are drawn at different dimensional scales in some cases for clarity of each of the components.

A projector 10 includes a light source apparatus 11, a uniform illumination system 12, a reflection mirror 13, a light modulator 14, and a projection system 15, as shown in FIG. 1. The projector 10 according to the present embodiment is a projector using a digital micromirror device (DMD).

The light source apparatus 11 includes a first light source section 17, a second light source section 18, a rotation unit 19, a light collection system 20, a pickup system 21, a polarization separation element 22, and a light emission control section 23. The first light source section 17 includes a first laser diode (LD) array 25 and a first collimation system 26. The second light source section 18 includes a second LD array 27, a second collimation system 28, a third LD array 29, a third collimation system 30, and a light combining element 31.

The second LD array 27, the second collimation system 28, the light combining element 31, the light collection system 20, the rotation unit 19, the pickup system 21, and the polarization separation element 22 are arranged along an optical axis AX0. The third LD array 29, the third collimation system 30, and the light combining element 31 are arranged along an optical axis AX1 perpendicular to the optical axis AX0. The first LD array 25, the first collimation system 26, and the polarization separation element 22 are arranged along an optical axis AX2 perpendicular to the optical axis AX0.

The first LD array 25 has a configuration in which a plurality of first semiconductor lasers 33 (first solid-state light sources) are arranged in a two-dimensional array. The number of first semiconductor lasers 33 or the arrangement thereof is not limited to a specific number or a specific arrangement. The first semiconductor lasers 33 emit excitation light LA for exciting a phosphor layer 48 on a rotating plate 41, which will be described later. The excitation light LA is light that belongs to a blue region and has a wavelength of, for example, 445 nm. The wavelength of the excitation light LA may be equal to the wavelength of blue light LB emitted from third semiconductor lasers 35, which will be described later, but is preferably shorter than the wavelength of the blue light LB and is preferably, for example, 445 nm±15 nm.

The first semiconductor lasers 33 are so arranged as to emit S-polarized light with respect to the polarization separation element 22. The first semiconductor lasers 33 may instead be so arranged as to emit P-polarized light with respect to the polarization separation element 22. In the latter case, for example, a half-wave plate may be disposed between the first semiconductor lasers 33 and the polarization separation element 22 to convert the polarization direction of the excitation light LA in such a way that the excitation light LA incident on the polarization separation element 22 is S-polarized light.

The first collimation system 26 is provided on the light exiting side of the first LD array 25. The first collimation system 26 includes a plurality of collimation lenses 37 arranged in a two-dimensional array in correspondence with the arrangement of the plurality of first semiconductor lasers 33 of the first LD array 25. The excitation light LA emitted from the first semiconductor lasers 33 of the first LD array 25 is parallelized when passing through the collimation lenses 37.

The polarization separation element 22 is formed of a polarizing beam splitter (PBS) that transmits light that belongs to a yellow region and has the function of separating polarized light fluxes that belong to a blue region from each other. The polarization separation element 22 transmits P-polarized light that belongs to the blue region but reflects S-polarized light that belongs to the blue region. The polarization separation element 22 is so disposed as to incline by 45° with respect to the optical axes AX0 and AX2. A plurality of excitation light beams LA outputted from the first LD array 25, which are S-polarized light beams when they are incident on the polarization separation element 22, are reflected off the polarization separation element 22, pass through the pickup system 21, and travel toward a first surface 41a of the rotating plate 41. The first light source section 17 thus causes the excitation light LA to be incident on a phosphor section 45 from the side facing the first surface 41a of the rotating plate 41.

The pickup system 21 includes a first pickup lens 211 and a second pickup lens 212. The first pickup lens 211 and the second pickup lens 212 are each formed of a convex lens. The pickup system 21 not only parallelizes color light LM outputted from the rotating plate 41 but collects the excitation light LA outputted from the first LD array 25 onto the phosphor section 45 on the rotating plate 41.

The second LD array 27 has a configuration in which a plurality of second semiconductor lasers 34 (second solid-state light sources) are arranged in a two-dimensional array. The number of second semiconductor lasers 34 or the arrangement thereof is not limited to a specific number or a specific arrangement. The second semiconductor lasers 34 emit red light LR, which forms part of light outputted from the light source apparatus 11. The wavelength of the red light LR is, for example, 635 nm.

The second collimation system 28 is provided on the light exiting side of the second LD array 27. The second collimation system 28 includes a plurality of collimation lenses 38 arranged in a two-dimensional array in correspondence with the arrangement of the plurality of second semiconductor lasers 34 of the second LD array 27. The red light LR emitted from the second semiconductor lasers 34 of the second LD array 27 is parallelized when passing through the collimation lenses 38.

The third LD array 29 has a configuration in which a plurality of third semiconductor lasers 35 (third solid-state light sources) are arranged in a two-dimensional array. The number of third semiconductor lasers 35 or the arrangement thereof is not limited to a specific number or a specific arrangement. The third semiconductor lasers 35 emit blue light LB, which forms part of the light outputted from the light source apparatus 11. The wavelength of the blue light LB is, for example, 465 nm. The wavelength of the blue light LB may be equal to the wavelength of the excitation light LA emitted from the first semiconductor lasers 33 but is preferably longer than the wavelength of the excitation light LA (445 nm), for example, is preferably 465 nm±15 nm.

The third semiconductor lasers 35 are so arranged as to emit P-polarized light with respect to the polarization separation element 22. The third semiconductor lasers 35 may instead be so arranged as to emit S-polarized light with respect to the polarization separation element 22. In the latter case, for example, a half-wave plate may be disposed between the third semiconductor lasers 35 and the polarization separation element 22 to convert the polarization direction of the blue light LB in such a way that the blue light LB incident on the polarization separation element 22 is P-polarized light.

The third collimation system 30 is provided on the light exiting side of the third LD array 29. The third collimation system 30 includes a plurality of collimation lenses 39 arranged in a two-dimensional array in correspondence with the arrangement of the plurality of third semiconductor lasers 35 of the third LD array 29. The blue light LB emitted from the third semiconductor lasers 35 of the third LD array 29 is parallelized when passing through the collimation lenses 39.

The light combining element 31 is formed of a dichroic mirror which transmits light that belongs to a red region but reflects light that belongs to a blue region. The light combining element 31 is so disposed as to incline by 45° with respect to the optical axes AX0 and AX1. The plurality of red light beams LR outputted from the second LD array 27 pass through the light combining element 31, and the plurality of blue light beams LB outputted from the third LD array 29 are reflected off the light combining element 31. The plurality of red light beams LR and the plurality of blue light beams LB are combined with each other to form the color light LM, which is magenta light, and the color light LM passes through the light collection system 20 and travels toward a second surface 41b of the rotating plate 41. The second light source section 18 thus causes the color light LM to be incident on a diffusive transmission section 46 from the side facing the second surface 41b of the rotating plate 41.

The light collection system 20 includes a light collection lens. The light collection lens is formed of a convex lens. The light collection system 20 may instead be formed of a plurality of light collection lenses. The light collection system. 20 collects the color light LM having exited out of the light combining element 31 onto the diffusive transmission section 46 on the rotating plate 41.

The rotation unit 19 includes the rotating plate 41 (rotor) and a motor 42 for rotating the rotating plate 41. The first surface 41a of the rotating plate 41 is irradiated with the excitation light LA, and the second surface 41b of the rotating plate 41 is irradiated with the color light LM. The rotating plate 41 is made, for example, of a metal having high thermal conductivity. The material of which the rotating plate 41 is made is not limited to a specific material, and in the case where the rotating plate 41 is made of a metal having high thermal conductivity, heat generated by the phosphor section 45 is likely to be dissipated. A rotary shaft 43 of the motor 42 is so disposed as to be roughly parallel to the optical axis AX0. The rotating plate 41 therefore rotates in a plane roughly perpendicular to the optical axis of the excitation light LA and the color light LM incident on the rotating plate 41.

The rotating plate 41 is formed in a circular shape when viewed in the direction of the rotary shaft 43, as shown in FIG. 2. It is, however, noted that the rotating plate 41 does not necessarily have a circular outer shape and may have, for example, a polygonal outer shape. The rotating plate 41 is provided with the phosphor section 45 and the diffusive transmission section 46 (diffuser section) along the direction of rotation R. The phosphor section 45 and the diffusive transmission section 46 are so provided as to be continuous with each other, and the two sections as a whole form a single annular shape.

The phosphor section 45 is what is called a reflective phosphor section having a configuration in which a reflection layer 47, a phosphor layer 48, and an antireflection layer 49 are layered on each other sequentially from the side facing the first surface 41a of the rotating plate 41, as shown in FIG. 1. In other words, the phosphor layer 48 is provided on the side facing the first surface 41a of the rotating plate 41. The reflection layer 47 is provided between the phosphor layer 48 and the rotating plate 41. The antireflection layer 49 is provided on a surface of the phosphor layer 48, the surface on the side opposite the reflection layer 47.

The phosphor layer 48 emits green fluorescence LG when excited with the excitation light LA. That is, the phosphor layer 48 contains phosphor particles (not shown) that absorbs the excitation light LA, convert the excitation light LA into the green fluorescence LG, and emit the green fluorescence LG. The phosphor particles can, for example, be a β-sialon-based phosphor. The phosphor particles may be made of one material or may be a mixture of particles made of two or more materials.

The reflection layer 47 is formed, for example, of a film made of a metal having high reflectance, such as aluminum and silver. Out of the fluorescence LG isotropically emitted in the phosphor layer 48, the reflection layer 47 reflects the fluorescence LG that travels toward the rotating plate 41 and directs the reflected fluorescence LG into the space facing the first surface 41a of the rotating plate 41. The presence of the reflection layer 47 allows increase in the efficiency of extraction of the fluorescence LG from the phosphor section 45.

The antireflection layer 49 is formed, for example, of a dielectric multilayer film. The presence of the antireflection layer 49 allows suppression of reflection of the excitation light LA at the surface of the phosphor layer 48 to increase the efficiency of use of the excitation light LA.

The diffusive transmission section 46 includes, for example, an opening 41h, which is provided in the rotating plate 41, and a diffuser plate 44, which is so provided as to close the opening 41h. The diffuser plate 44 includes a transparent plate and a plurality of diffusing particles dispersed in the transparent plate and having a refractive index different from the refractive index of the transparent plate. The diffuser plate 44 may not necessarily contain diffusing particles, and a diffusion capability may, for example, be imparted to one surface of the transparent plate by formation of minute irregularities or use of any other approach. The diffusive transmission section 46 diffuses the color light LM while transmitting the color light LM through the rotating plate 41 from the second surface 41b toward the first surface 41a thereof.

The light emission control section 23 controls the on/off actions of the first semiconductor lasers 33, the second semiconductor lasers 34, and the third semiconductor lasers 35, as shown in FIG. 1.

During the period for which the rotating plate 41 is rotated, the light emission control section 23 turns on the first semiconductor lasers 33 when the angle of rotation of the rotating plate 41 falls within an angular range where the excitation light LA is allowed to be incident on the phosphor section 45 and turns off the first semiconductor lasers 33 when the angle of rotation of the rotating plate 41 falls within an angular range where the excitation light LA is not allowed to be incident on the phosphor section 45. Further, the light emission control section 23 turns on the second semiconductor lasers 34 and the third semiconductor lasers 35 when the angle of rotation of the rotating plate 41 falls within an angular range where the color light LM is allowed to be incident on the diffusive transmission section 46 and turns off the second semiconductor lasers 34 and the third semiconductor lasers 35 when the angle of rotation of the rotating plate 41 falls within an angular range where the color light LM is not allowed to be incident on the diffusive transmission section 46.

The color light LM containing the red light LR and the blue light LB passes through the diffusive transmission section 46, which is formed of one region, but the red light LR and the blue light LB sequentially exit out of the rotating plate 41 because the second semiconductor lasers 34 and the third semiconductor lasers 35 are driven in a time division manner. As a result, when the rotating plate 41 makes one revolution, the red light LR, the blue light LB, and the green fluorescence LG sequentially each exit once out of the rotating plate 41.

The fluorescence LG and the color light LM having exited out of the rotating plate 41 are parallelized by the pickup system 21 and then incident on the polarization separation element 22.

In a case where the rotating plate 41 is rotated at a fixed speed, the ratio between the area of the phosphor section 45 and the area of the diffusive transmission section 46 corresponds to the ratio between the period for which the fluorescence LG exits out of the period required for the rotating plate 41 to make one revolution and the period for which the color light LM exits out thereof. For example, in a case where the ratio between the area of the phosphor section 45 and the area of the diffusive transmission section 46 is 2:1, the ratio between the period for which the fluorescence LG exits out of the period required for the rotating plate 41 to make one revolution and the period for which the color light LM exits out thereof is 2:1. Further, the tint of the light outputted from the light source apparatus 11 can be adjusted by changing the ratio between the period for which the green fluorescence LG exits and the period for which the color light LM containing the red light LR and the blue light LB exits. The ratio between the area of the phosphor section 45 and the area of the diffusive transmission section 46 may therefore be set as appropriate in the process of adjusting the tint of the light outputted from the light source apparatus 11.

The polarization separation element 22 transmits light that belongs to a yellow region and has the function of separating polarized light fluxes that belong to a blue region from each other, as described above. The green fluorescence LG and the red light LR in the color light LM having exited out of the pickup system 21 therefore pass through the polarization separation element 22 and exit out of the light source apparatus 11. The polarization state of the blue light LB in the color light LM has been so adjusted that the blue light LB incident on the polarization separation element 22 is P-polarized light. The blue light LB is therefore passes through the polarization separation element 22 and exits out of the light source apparatus 11.

The light outputted from the light source apparatus 11 is incident on the uniform illumination system 12. The uniform illumination system 12 includes a light-incident-side lens 121, a rod integrator 122, and a light-exiting-side lens 123. Light L collected by the light-incident-side lens 121 and incident on the rod integrator 122 travels through the rod integrator 122 while totally reflected therein and therefore has a uniform intensity distribution at the light exiting surface of the rod integrator 122. The light L having exited out of the rod integrator 122 passes through the light-exiting-side lens 123 and travels toward the reflection mirror 13.

The light L having exited out of the uniform illumination system 12 is reflected off the reflection mirror 13 and travels toward the light modulator 14. The angle at which the reflection mirror 13 is installed is so set that the light L from the light source apparatus 11 (red light, blue light, and green light) is entirely reflected toward the light modulator 14.

The light modulator 14 is formed of a DMD (digital micromirror device). A DMD has a configuration in which a plurality of micromirrors are arranged in a matrix. The DMD changes the inclination of the plurality of micromirrors to switch the direction in which the light incident on the DMD is reflected between the direction in which the light is incident on the projection system 15 and the direction in which the light is not incident on the projection system 15. The light modulator 14 thus sequentially modulates the red light, green light (fluorescence), and the blue light outputted from the light source apparatus 11 to produce a green image, a red image, and a blue image. The projection system 15 projects the green image, the red image, and the blue image on a screen (not shown).

As described above, the light source apparatus 11 according to the present embodiment includes the second light source section 18, which includes the second semiconductor lasers 34, which emit the red light LR, and the third semiconductor lasers 35, which emit the blue light LB, and outputs the color light LM containing the red light LR and the blue light LB. Therefore, even if a red light component derived from the fluorescence is insufficient, as in the case of a light source apparatus of related art using a yellow phosphor, the insufficient red light component can be compensated by the red light LR emitted from the second semiconductor lasers 34 of the second light source section 18, whereby the proportion of the red light component in the light outputted from the light source apparatus 11 can be increased as compared with the proportion of the red light component in related art.

In the light source apparatus 11 according to the present embodiment, since the red light LR is supplied from the second semiconductor lasers 34, the fluorescence needs to contain no red light component. Therefore, the phosphor section 45 does not need to be formed of a yellow phosphor but can be formed of a green phosphor, whereby the amount of green light component can also be sufficiently supplied. Further, even if the majority of the excitation light LA, which belongs to a blue region, is absorbed by the phosphor section 45, the third semiconductor lasers 35 of the second light source section 18 supplies the blue light LB. As a result, since the amounts of red light, green light, and blue light are sufficiently supplied, the projector 10 achieved in the present embodiment projects an image having a wide color range and excels in color reproduction.

Since the laser beams used in the light source apparatus 11 are highly coherent, speckles are likely to occur. To address the problem, in the light source apparatus 11 according to the present embodiment, the color light LM containing the red light LR and the blue light LB is diffused by the diffusive transmission section 46, which is provided on the rotating plate 41. Therefore, since a plurality of speckle patterns different from one another are not only spatially but temporally superimposed on one another on the screen, a viewer is unlikely to be visually recognize the speckles.

The light source apparatus 11 has the configuration in which the excitation light LA is incident on the phosphor section 45 from the side facing the first surface 41a of the rotating plate 41 and the color light LM is incident on the diffusive transmission section 46 from the side facing the second surface 41b of the rotating plate 41. According to the configuration, the first light source section 17 and the second light source section 18 can be disposed on the opposite sides of the rotating plate 41, so that the first light source section 17 and the second light source section 18 will not interface with each other. The size of the light source apparatus 11 can therefore be reduced.

In the light source apparatus 11, the phosphor section 45 is what is called a reflective phosphor section that includes the reflection layer 47 and emits the fluorescence LG toward the side on which the excitation light LA is incident. On the other hand, the diffusive transmission section 46 is so configured as to diffuse the color light LM while transmitting the color light LM through the rotating plate 41 from the second surface 41b toward the first surface 41a thereof. According to the configurations described above, the fluorescence LG and the color light LM both exit via the first surface 41a of the rotating plate 41 and travel in the same direction. As a result, even in the configuration in which the first light source section 17 and the second light source section 18 are disposed on opposite sides of the rotating plate 41, the optical path of the light from the first light source section 17 or the light from the second light source section 18 does not need to be routed around, whereby the size of the light source apparatus 11 can be reduced.

Further, since the phosphor section 45 has the antireflection layer 49, which reduces the amount of reflection of the excitation light LA, the excitation light LA is efficiently allowed to be incident on the phosphor layer 48.

The light source apparatus 11 includes the polarization separation element 22 having the function of separating polarized light fluxes that belong to a blue region from each other, and the excitation light LA and the blue light LB incident on the polarization separation element 22 are set to be S-polarized light and P-polarized light, respectively. According to the configuration, the first light source section 17 can be disposed on the side facing the first surface 41a of the rotating plate 41 with no interference with the blue light LB that exits via the first surface 41a of the rotating plate 41. As a result, the optical path of the blue light LB does not need to be routed around, whereby the size of the light source apparatus 11 can be reduced.

In the light source apparatus 11, the wavelength λ of the excitation light LA is shorter than or equal to the wavelength of the blue light LB and is 445 nm±15 nm. That is, a semiconductor laser capable of emitting light having the wavelength of 445 nm±15 nm is used as each of the first semiconductor lasers 33, which emit the excitation light LA. The light emission efficiency in the phosphor section 45 can therefore be sufficiently increased, as compared with a case where the same semiconductor lasers as the third semiconductor lasers 35, which emit light having the wavelength of 465 nm, are used in the first light source section 17.

The light emission control section 23 turns on the first semiconductor lasers 33 when the angle of rotation of the rotating plate 41 falls within the angular range where the excitation light LA is allowed to be incident on the phosphor section 45 and turns on the second semiconductor lasers 34 and the third semiconductor lasers 35 when the angle of rotation of the rotating plate 41 falls within the angular range where the color light LM is allowed to be incident on the diffusive transmission section 46. That is, the first semiconductor lasers 33 are turned off during the period for which the excitation light LA is not incident on the phosphor section 45, and the second semiconductor lasers 34 and the third semiconductor lasers 35 are turned off during the period for which the color light LM is not incident on the diffusive transmission section 46. The electric power consumed by the semiconductor lasers 33, 34, and 35 can be reduced.

Second Embodiment

A second embodiment of the invention will be described below with reference to FIG. 3.

The basic configuration of a projector according to the second embodiment is the same as that in the first embodiment but differs therefrom in terms of the configuration of the light source apparatus, specifically, the rotation unit. No description of the projector or the light source apparatus will therefore be made, and only the rotation unit will be described.

Figure 3:
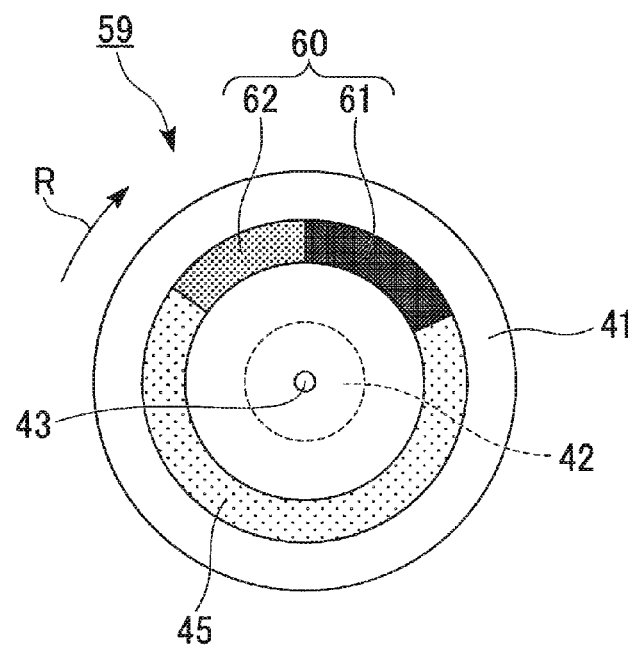
FIG. 3 is a front view of the rotation unit in a second embodiment.

FIG. 3 is a front view of the rotation unit in the second embodiment.

In FIG. 3, the components common to those shown in FIG. 2 and used in the first embodiment have the same reference characters and will not be described.

A rotation unit 59 in the second embodiment includes the rotating plate 41 (rotor) and the motor 42, as shown in FIG. 3. The rotating plate 41 is provided with the phosphor section 45 and a diffusive transmission section 60 (diffuser section) along the direction of rotation R.

The diffusive transmission section 60 includes a diffusive transmission section for red light 61, which diffusively transmits red light, and a diffusive transmission section for blue light 62, which diffusively transmits blue light. The diffusive transmission section for red light 61 and the diffusive transmission section for blue light 62 are provided along the direction of rotation R of the rotating plate 41. The phosphor section 45, the diffusive transmission section for red light 61, and the diffusive transmission section for blue light 62 are so provided as to be continuous with one another, and the three sections as a whole forma single annular shape. The configuration of the phosphor section 45 is the same as that in the first embodiment.

The diffusing function of the diffusive transmission section for red light 61 and the diffusing function of the diffusive transmission section for blue light 62 may be the same, but the diffusing function of the diffusive transmission section for red light 61 is preferably higher in terms of performance than the diffusing function of the diffusive transmission section for blue light 62. Specifically, for example, the density of the diffusing particles in the diffusive transmission section for red light 61 can be set to be greater than the density of the diffusing particles in the diffusive transmission section for blue light 62 to set the diffusing function of the diffusive transmission section for red light 61 to be higher in terms of performance than the diffusing function of the diffusive transmission section for blue light 62.

The present embodiment can also provide the same advantageous effects provided by the first embodiment, such as increase in the proportion of red light in the light outputted from the light source apparatus, and achievement of a projector that excels in color reproduction.

Further, in the case where the diffusing function of the diffusive transmission section for red light 61 is set to be higher in terms of performance than the diffusing function of the diffusive transmission section for blue light 62 in the light source apparatus according to the present embodiment, the speckle removable effect particularly for the red light, which is more likely to cause speckles to be visually recognized, can be enhanced.

Third Embodiment

A third embodiment of the invention will be described below with reference to FIG. 4.

The basic configuration of a projector according to the third embodiment is the same as that in the first embodiment but differs therefrom in terms of the configuration of the light source apparatus, specifically, the rotation unit. No description of the projector or the light source apparatus will therefore be made, and only the rotation unit will be described.

Figure 4:
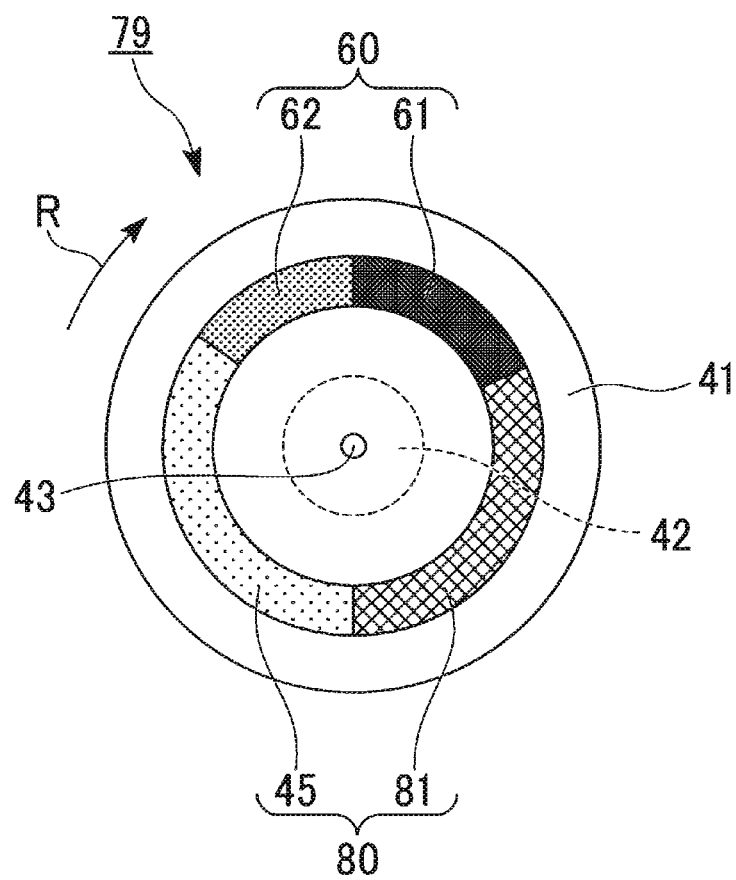
FIG. 4 is a front view of the rotation unit in a third embodiment.

FIG. 4 is a front view of the rotation unit in the third embodiment.

In FIG. 4, the components common to those shown in FIG. 2 and used in the first embodiment have the same reference characters and will not be described.

A rotation unit 79 in the third embodiment includes the rotating plate 41 (rotor) and the motor 42, as shown in FIG. 4. The rotating plate 41 is provided with a phosphor section 80 and the diffusive transmission section 60 (diffuser section) along the direction of rotation R.

The phosphor section 80 includes the green phosphor section 45, which emits green light, and a yellow phosphor section 81, which emits yellow light. The green phosphor section 45 and the yellow phosphor section 81 are provided along the direction of rotation R of the rotating plate 41. The phosphor particles that form the yellow phosphor section 81 can, for example, be a YAG-based (yttrium-aluminum-garnet-based) phosphor.

The diffusive transmission section 60 includes the diffusive transmission section for red light 61, which diffusively transmits red light, and the diffusive transmission section for blue light 62, which diffusively transmits blue light. The diffusive transmission section for red light 61 and the diffusive transmission section for blue light 62 are provided along the direction of rotation R of the rotating plate 41. The diffusing function of the diffusive transmission section for red light 61 is preferably higher in terms of performance than the diffusing function of the diffusive transmission section for blue light 62 also in the present embodiment. The green phosphor section 45, the yellow phosphor section 81, the diffusive transmission section for red light 61, and the diffusive transmission section for blue light 62 are so provided as to be continuous with one another, and the four sections as a whole form a single annular shape. The other configurations are the same as those in the first embodiment.

The present embodiment can also provide the same advantageous effects provided by the first and second embodiments, such as increase in the proportion of red light in the light outputted from the light source apparatus, and achievement of a projector that excels in color reproduction.

In the case where the diffusing function of the diffusive transmission section for red light 61 is set to be higher in terms of performance than the diffusing function of the diffusive transmission section for blue light 62 also in the light source apparatus according to the present embodiment, the speckle removable effect particularly for the red light, which is more likely to cause speckles to be visually recognized, can be enhanced.

Further, in the light source apparatus according to the present embodiment, since the phosphor section 80 includes the yellow phosphor section 81, and the phosphor section 80 emits yellow light as well as green light, the brightness of an image can be improved, as compared with the second embodiment. Moreover, since the yellow light contains a red light component, the amount of red light emitted from the second semiconductor lasers 34 can be reduced. In the case where the yellow phosphor is used, it is necessary to separate the red light and the green light from the yellow light. In this case, a color wheel for separating the red light and the green light may be disposed, for example, in the vicinity of the light incident surface or the light exiting surface of the rod integrator.

The technical scope of the invention is not limited to the embodiments described above, and a variety of changes can be made thereto to the extent that the changes do not depart from the substance of the invention.

For example, the above embodiments have been described with reference to the case where the rotor is provided with the reflective phosphor section and the transmissive diffuser section. Instead, a transmissive phosphor section and a reflective diffuser section may be used, and the combination of the phosphor section and the diffuser section is not limited to that in the embodiments described above. Further, the second light source section is not necessarily so configured that the light combining element that combines the red light outputted from the second LD array and the blue light outputted from the third LD array with each other. For example, second semiconductor lasers that emit red light and third semiconductor lasers that emit blue light may be arranged in an array to form a single LD array.

In addition to the above, the shape, the number, the arrangement, the material, and other factors of the variety of components of the light source apparatus and the projector are not limited to those in the embodiments described above and can be changed as appropriate.

Further, the above embodiments have been described with reference to the case where the light source apparatus according to any of the embodiments of the invention is incorporated in a projector, but not necessarily. The light source apparatus according to any of the embodiments of the invention may be used with a lighting apparatus, a headlight of an automobile, and other apparatus.

The entire disclosure of Japanese Patent Application No. 2016-229801, filed on Nov. 28, 2016 is expressly incorporated by reference herein.

What is claimed is:

1. A light source apparatus comprising:
a first light source section that includes a first solid-state light source that emits excitation light;
a second light source section that includes a second solid-state light source that emits red light and a third solid-state light source that emits blue light and outputs color light containing the red light and the blue light; and
a rotor irradiated with the excitation light and the color light,
wherein the rotor is provided with a phosphor section that emits fluorescence when irradiated with the excitation light and a diffuser section that diffuses the color light and outputs the diffused color light, and
wherein the rotor is provided with the phosphor section and the diffuser section provided along a direction of rotation of the rotor.

2. The light source apparatus according to claim 1,
wherein the first light source section causes the excitation light to be incident on the phosphor section from a side facing a first surface of the rotor, and
the second light source section causes the color light to be incident on the diffuser section from a side facing a second surface of the rotor.

3. The light source apparatus according to claim 2,
wherein the phosphor section includes a phosphor layer provided on the side facing the first surface of the rotor and a reflection layer provided between the phosphor layer and the rotor, and the diffuser section includes a diffusive transmission section that diffusively transmits the color light through the rotor from the second surface to the first surface thereof.

4. The light source apparatus according to claim 3, wherein the phosphor section further includes an antireflection layer provided on a surface of the phosphor layer, the surface on a side opposite the reflection layer.

5. The light source apparatus according to claim 3,
further comprising a polarization separation element that is provided not only in an optical path of the excitation light traveling from the first light source section toward the rotor but in an optical path of the fluorescence and the color light outputted from the rotor and has a function of separating polarized light fluxes that belong to a blue region from each other,
wherein the excitation light incident on the polarization separation element is one of S-polarized light and P-polarized light, and
the blue light incident on the polarization separation element is another of S-polarized light and P-polarized light.

6. The light source apparatus according to claim 3,
wherein the diffusive transmission section includes a diffusive transmission section for red light that diffusively transmits the red light and a diffusive transmission section for blue light that diffusively transmits the blue light, and
the diffusive transmission section for red light and the diffusive transmission section for blue light are provided along the direction of rotation of the rotor.

7. The light source apparatus according to claim 6, wherein a diffusing function of the diffusive transmission section for red light is higher in terms of performance than the diffusing function of the diffusive transmission section for blue light.

8. The light source apparatus according to claim 1, wherein the phosphor section includes at least one of a green phosphor section that emits green light and a yellow phosphor section that emits yellow light.

9. The light source apparatus according to claim 8,
wherein the phosphor section includes the green phosphor section and the yellow phosphor section, and
the green phosphor section and the yellow phosphor section are provided along the direction of rotation of the rotor.

10. The light source apparatus according to claim 1, wherein a wavelength of the excitation light is shorter than or equal to a wavelength of the blue light.

11. The light source apparatus according to claim 10, wherein the wavelength of the excitation light is 445 nm±15 nm.

12. The light source apparatus according to claim 10, wherein a wavelength of the blue light is 465 nm±15 nm.

13. The light source apparatus according to claim 1,
further comprising a light emission control section that controls on/off actions of the first solid-state light source, the second solid-state light source, and the third solid-state light source,
wherein the light emission control section turns on the first solid-state light source when an angle of rotation of the rotor falls within an angular range where the excitation light is allowed to be incident on the phosphor section.

14. The light source apparatus according to claim 1,
further comprising a light emission control section that controls on/off actions of the first solid-state light source, the second solid-state light source, and the third solid-state light source,
wherein the light emission control section turns on the second solid-state light source and the third solid-state light source when an angle of rotation of the rotor falls within an angular range where the color light is allowed to be incident on the diffuser section.

15. The light source apparatus according to claim 1, wherein the first solid-state light source, the second solid-state light source, and the third solid-state light source are each formed of a semiconductor laser.

16. A projector comprising:
the light source apparatus according to claim 1;
a light modulator that modulates light from the light source apparatus in accordance with image information to produce image light; and
a projection system that projects the image light from the light modulator.

17. The projector according to claim 16, wherein the light modulator is formed of a digital micromirror device.

* * * * *